US006229881B1

(12) United States Patent
Alonso et al.

(10) Patent No.: US 6,229,881 B1
(45) Date of Patent: May 8, 2001

(54) METHOD AND APPARATUS TO PROVIDE ENHANCED SPEECH RECOGNITION IN A COMMUNICATION NETWORK

(75) Inventors: Tirso M. Alonso, New Providence; Egbert Ammicht, Budd Lake; Bruce Melvin Buntschuh, Berkeley Heights, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/207,369

(22) Filed: Dec. 8, 1998

(51) Int. Cl.$^7$ .............................. G01L 15/22; H04M 1/64
(52) U.S. Cl. ...................... 379/88.01; 704/270; 704/275
(58) Field of Search ........................ 379/88.01; 704/270, 704/275

(56) References Cited

U.S. PATENT DOCUMENTS

| | | | |
|---|---|---|---|
| 5,594,789 | * | 1/1997 | Seazholtz et al. .................... 379/207 |
| 5,978,450 | * | 11/1999 | McAllister et al. ............... 379/88.02 |
| 6,038,305 | * | 3/2000 | McAllister et al. ................. 379/207 |
| 6,067,347 | * | 5/2000 | Farris et al. ....................... 380/88.01 |
| 6,104,913 | * | 8/2000 | McAllister .............................. 455/41 |

OTHER PUBLICATIONS

William E. Longenbaker, et al. "Automation of Operator Services: A Successful Application of Speech Recognition Technology", Proc. 2nd IEEE Workshop on Interactive Voice Technology for Telecommunications Applications (IVTTA 94), p. 161–164, Sep. 1994.*

R. J. Perdue, et al. "The Way We Were: Speech technology, Platforms, and Applications in the Old AT&T", Proc. 3rd IEEE Workshop on Interactive Voice Technology for Telecommunication Applications (IVVTT 96), p. 7–11, Sep. 1996.*

* cited by examiner

Primary Examiner—Tālivaldis Šmits

(57) ABSTRACT

A method and apparatus for enhanced speech recognition in a communication network in which a first input port is coupled to a first processor and receives a telephony signal from the communication network. A second input port, coupled to a second processor, receives the same telephony signal at substantially the same time as the first input port. Based on the telephony signal, the second processor generates recognized speech information. A control line coupled between the first and second processors lets the second processor send a command to the first processor, and the first processor changes state, such as by re-routing the telephony signal, based on the command. The second processor may also enter one of a plurality of states such that the state of the second processor corresponds to the state of the first processor at a given point during a telephone call. Instead of receiving the telephony signal, the second processor may receive speech data generated by the first processor.

40 Claims, 5 Drawing Sheets

METHOD AND APPARATUS TO PROVIDE ENHANCED SPEECH RECOGNITION IN A COMMUNICATION NETWORK

FIELD OF THE INVENTION

The present invention relates to speech recognition. More particularly, the present invention relates to a method and apparatus that provides enhanced speech recognition in a communication network.

BACKGROUND OF THE INVENTION

FIG. 1 is a block diagram of a known telephone call handling system that uses speech recognition. When a call is placed from a telephone 10, a telephony signal is routed through a communication switch 20. The communication switch 20, such as a switch in the Public Switched Telephone Network (PSTN), can route the telephony signal to a communication network service provider operator platform 30. In this case, a telephone operator can interact with the caller, such as to determine if the caller has a question about a telephone bill or needs directory assistance. Once the purpose of the call is determined, the operator can route the telephony signal as appropriate.

Having a live operator interact with callers can be expensive for the network service provider. Therefore, the service provider may instead route the telephony signal to an intelligent Voice Recognition Call Processing (VRCP) adjunct 100. As used herein, an "adjunct" is a device that responds to a request for service processing in a communication network. As shown in FIG. 1, the VRCP adjunct 100 receives the telephony signal through a communication link, such as a PSTN digital T-1 connection, using media processing circuit boards.

An application infrastructure in the VRCP adjunct 100 automatically determines the purpose of the telephone call, such as by using speech recognition, and re-routes the telephony signal as required. If the VRCP adjunct 100 cannot determine the purpose of a particular call, the signal can be re-routed to the operator platform 30. The Conversant Version 5.0 Personal Computer (PC) based system available from Lucent Technologies is an example of such a VRCP adjunct 100.

A basic adjunct may simply respond to touch tone keypad signals, such as Dual-Tone Multi-Frequency (DTMF) signals, selected by the caller. For example, the adjunct may play the following message to a caller: "press '1' if you have a billing question and press '2'for directory assistance." The adjunct would then re-route the telephony signal based on the received DTMF signal.

The VRCP adjunct 100 shown in FIG. 1 also has a limited amount of speech recognition capability. For example, the VRCP adjunct 100 may play the following message: "say the word 'one' if you have a billing question and say the word 'two' for directory assistance." The VRCP adjunct 100 can then re-route the telephony signal if a "key word," such as the word "one" or "two," is recognized in the received speech signal. If the VRCP adjunct 100 does not recognize the received speech signal as being a key word, the telephony signal can be re-routed to the operator platform 30. A live operator will then determine the purpose of the telephone call.

If the speech recognition capabilities of the VRCP adjunct 100 could be enhanced, such as by recognizing a larger number of key words or by recognizing commonly used phrases, the amount of operator time spent determining the purpose of telephone calls would be further reduced. The How May I Help You (HMIHY) system developed by AT&T is an example of a system with enhanced speech recognition capabilities.

There are a number of problems, however, with providing enhanced speech recognition capabilities in a communication network. For example, a number of VRCP adjuncts with limited capabilities may already be installed in the network. The hardware and/or software used in these existing, limited capability, VRCP adjuncts may be insufficient to support the more advanced processing techniques required by the enhanced speech recognition system, and it may be difficult to update the hardware used by a limited capability VRCP adjunct to provide enhanced speech recognition capabilities. For example, replacing and retesting existing limited capability VRCP adjuncts could be an expensive and time consuming task. Similarly, updating the software used by a limited capability VRCP may be prohibitively difficult.

In view of the foregoing, it can be appreciated that a substantial need exists for a method and apparatus that uses a limited capability VRCP adjunct to provide enhanced speech recognition capabilities in a communication network, and solves the other problems discussed above.

SUMMARY OF THE INVENTION

The disadvantages of the art are alleviated to a great extent by a method and apparatus that uses a limited capability VRCP adjunct to provide enhanced speech recognition capabilities in a communication network. In one embodiment of the present invention, a first input port is coupled to a first processor and receives a telephony signal from a communication network. A second input port, coupled to a second processor, receives the same telephony signal at substantially the same time as the telephony signal is received at first input port. The second processor generates recognized speech information based on the telephony signal, and a control line is coupled between the first and second processors. Based on the recognized speech information, the second processor sends a command to the first processor. The first processor then changes state, such as by re-routing the telephony signal, based on the command.

In another embodiment of the present invention, a first input port receives a telephony signal from a communication network, and a first processor coupled to the first input port enters one of a plurality of states based on the telephony signal. A second input port receives information associated with the telephony signal, and a second processor coupled to the second input port generates recognized speech information based on the received information associated with the telephony signal. The second processor also enters one of a plurality of states based on the information associated with the telephony signal such that the state of the second processor corresponds to the state of the first processor at a given point during the telephone call.

In still another embodiment of the present invention, a first input port is configured to receive a telephony signal from a communication network and a first processor, coupled to the first input port, generates speech data based on the telephony signal. A second input port coupled to a second processor receives the speech data from the first processor. The second processor generates recognized speech information based on this speech data. A control line coupled between said first and second processors lets the second processor send a command to the first processor based on the recognized speech information. The first processor may then re-route the telephony signal based on the command.

DETAILED DESCRIPTION

Figure 1:
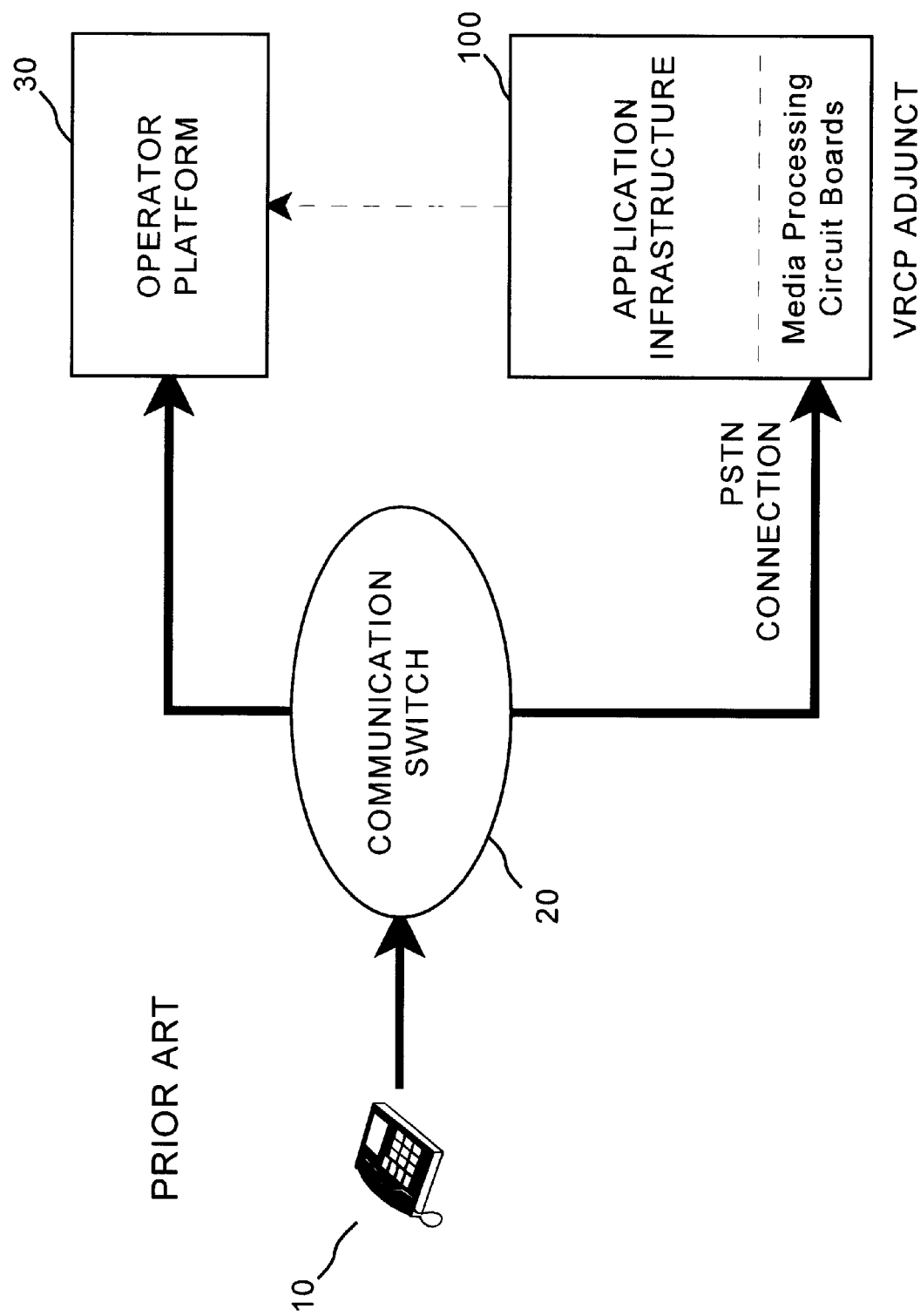
FIG. 1 is a block diagram of a known telephone call handling system that uses speech recognition.
Figure 2:
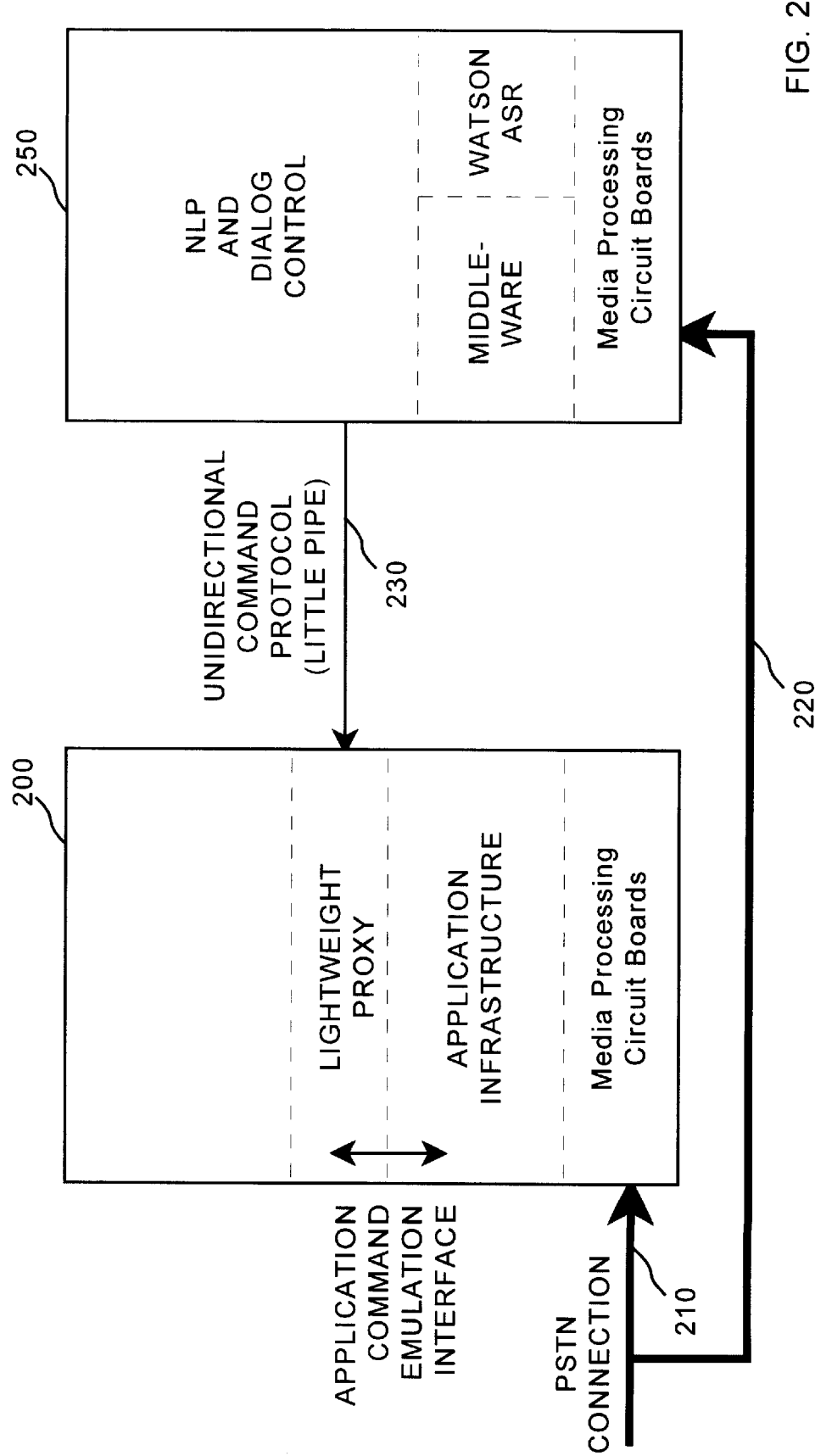
FIG. 2 is a block diagram of an enhanced speech recognition system according to an embodiment of the present invention.

The present invention is directed to a method and apparatus that provides enhanced speech recognition in a communication network. Referring now in detail to the drawings wherein like parts are designated by like reference numerals throughout, there is illustrated in FIG. 2 a block diagram of an enhanced speech recognition system according to an embodiment of the present invention.

The system acts as a VRCP adjunct, and comprises a first processor 200 that receives a telephony signal from a communication network (not shown in FIG. 2) at a first input port through a first communication link 210, such as a PSTN communication link. The first communication link 210 may be, for example, a T-1 connection received by media processing circuit boards. The first communication link 210 may also be, for example, a T-3, a Basic Rate Interface (BRI) or a typical analog connection. As used herein, the phrase "telephony signal" includes, for example, signals received over a voice communication channel, such as a channel established using a PSTN, wireless network or IP telephony connection. The first processor 200 may be, for example, based on a Conversant Version 5.0 system available from Lucent Technologies. The first processor 200 uses an application infrastructure, which may be similar to existing application infrastructures, to change processor states as required.

The enhanced voice recognition system further comprises a second processor 250. According to this embodiment of the present invention, the second processor 250 receives the same telephony signal at a second input port through a second communication link 220. The second communication link 220 may be, for example, a T-1 connection received directly from the PSTN using media processing circuit boards. If the second communication link 220 is a T-1 line, normal telephone connection equipment may be used to provide the telephony signal to the second processor 250, resulting in a robust connection that can be predictably routed. The second communication link 220 may also be received through a "big pipe" connected to the first processor 200, provided the first processor 200 and the second processor 250 receive the telephony signal at substantially the same time.

The second processor 250 is capable of executing an enhanced speech recognition process such as a Watson Automatic Speech Recognition (ASR) process used by the HMIHY system. As a result of the enhanced speech recognition process, the second processor 250 generates recognized speech information based on the telephony signal. The recognized speech information is provided to a Natural Language Process (NLP) and a dialog control process, which interacts with the caller to determine the purpose of the telephone call, such as by asking a caller follow-up questions. If desired, middleware, such as a Computer Telephony (CT) Media or AppServer application, can be used to perform common functions such as answering the telephone call and detecting DTMF signals.

The NLP and dialog control process generate a command that is sent to the first processor 200 through a control line communication link 230. The command can be sent using a unidirectional command protocol, and may be a simple text string representing the purpose of the telephone call. Thus, the control line 230 only needs to be a link with a very limited bandwidth, or a "little pipe."

The first processor 200 interprets the command using a simple, or "lightweight," proxy that communicates with an application infrastructure using an application command emulation interface. A "proxy" is an application that may act on behalf of another application, such as to translate a command. In this case, the lightweight proxy translates a command from the second processor 250 into one or more commands that are recognized by the application infrastructure. As a result of the command received from the second processor 250, the first processor 200 changes state as appropriate. The first processor 200 may change states by, for example, re-routing the telephony signal, playing a recorded message, executing a database "dip" or performing some other action as appropriate.

By using the second processor 250 to execute the complex enhanced speech recognition processing, the present invention lets existing, less powerful VRCP adjunct hardware and/or software be used to change states as required. The first processor 200 may actually control the call, using an application infrastructure similar to, or even identical to, the application infrastructure of existing VRCP adjuncts. The second processor 250 "eavesdrops" on the call using the second communication link 220, processes the speech information and commands the first processor 200 to change states.

Note that the first processor 200 and second processor 250 receive and process the telephony signal independently. As a result, the system may be designed such that the state of the second processor 250 will "shadow" the state of the first processor 200 at a given point in the telephone call. For example, the first processor 200 may enter a state to determine the general purpose of a telephone call. When the first processor 200 determines that the purpose of the telephone call is directory assistance, the first processor 200 may enter a different state to determine if local or long distance directory assistance is required. The state of the second processor 250 may need to correspond to the state of the first processor 200 in order to send proper commands over the command line 230. Thus, the second processor 250 may monitor the telephony signal, received through the second communication link 220, and emulate the state of the first processor 200. Instead of using a shadow architecture, another connection, such as a little pipe (not shown in FIG. 2) carrying state information from the first processor 200 to the second processor 250, may be used to synchronize the two processors 200, 250.

Figure 3:
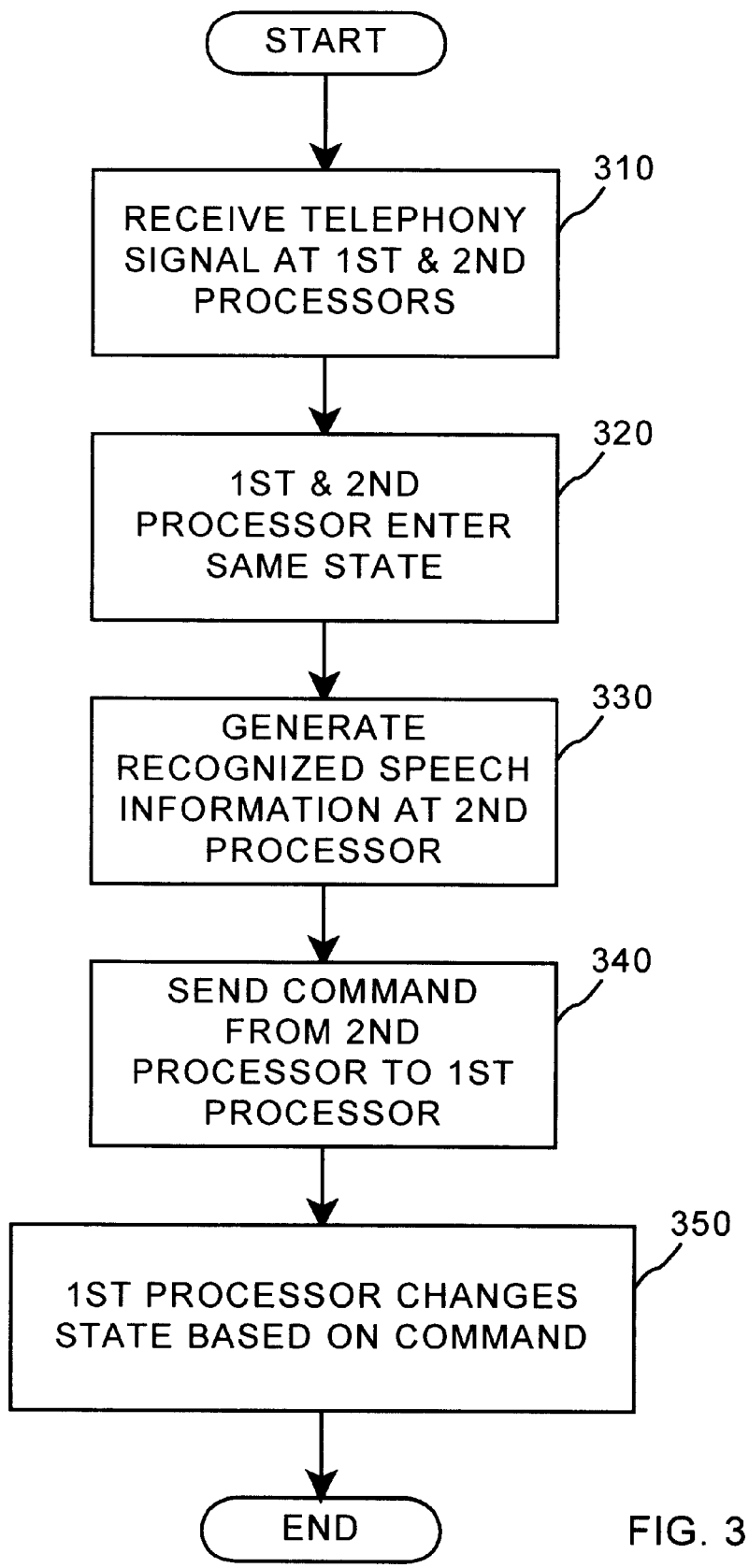
FIG. 3 is a block flow diagram of a method for providing enhanced speech recognition according to the embodiment of the present invention shown in FIG. 2.

FIG. 3 is a block flow diagram of a method for providing enhanced speech recognition according to the embodiment of the present invention shown in FIG. 2. After the process begins, a telephony signal is received by a first and second processor at step 310. As explained above, the first and second processors may enter corresponding states at step 320. Recognized speech information is generated by the second processor based on the telephony signal at step 330, and a command is sent from the second processor to the first processor based on the recognized speech information as indicated at step 340. Finally, the first processor changes state based on the command at step 350.

Figure 4:
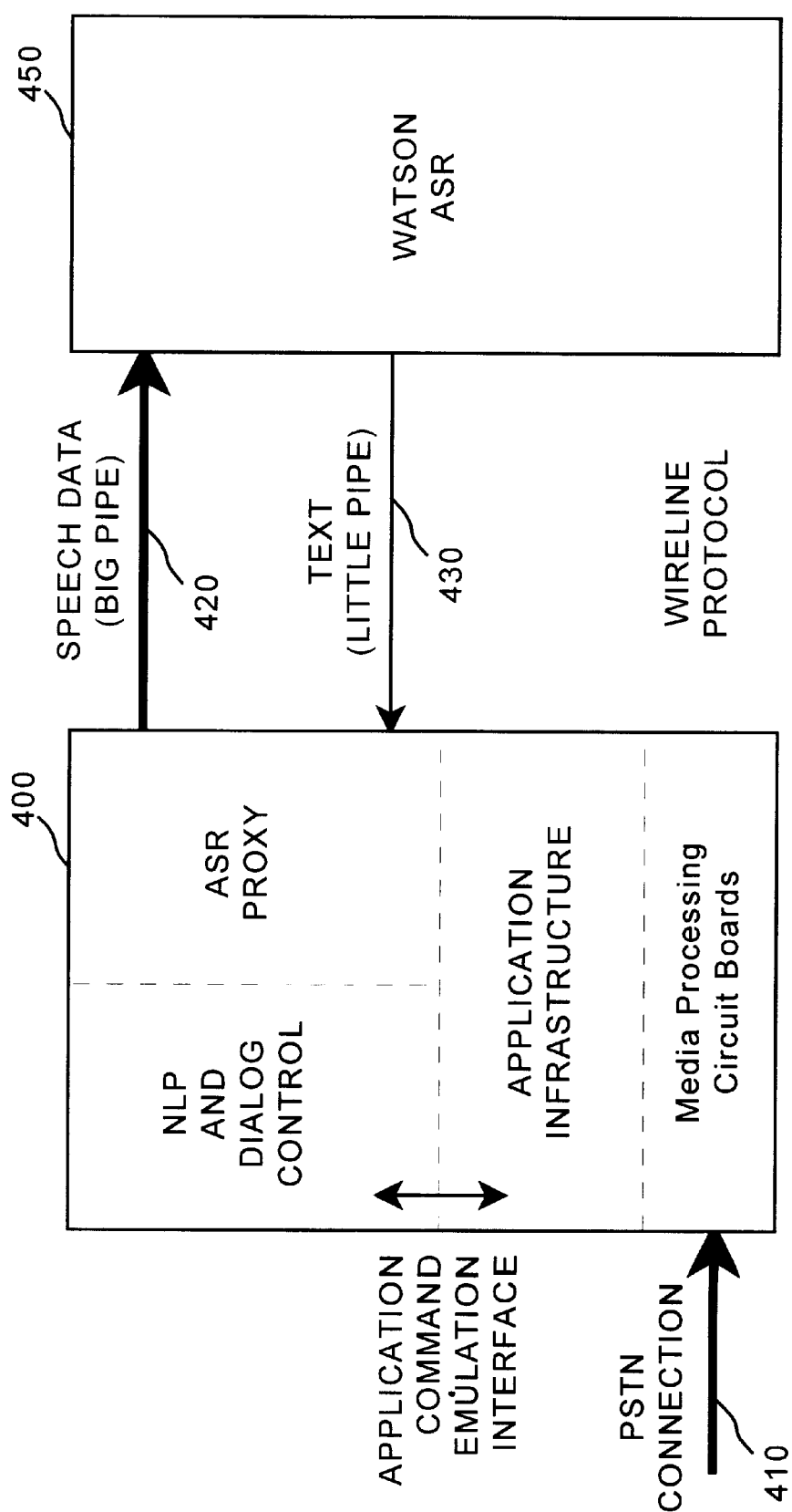
FIG. 4 is a block diagram of an enhanced speech recognition system according to another embodiment of the present invention.

FIG. 4 is a block diagram of an enhanced speech recognition system according to another embodiment of the present invention. As before, the system acts as a VRCP adjunct, and comprises a first processor 400, such as a Conversant system, that receives a telephony signal through a first communication link 410, such as a PSTN connection. The first processor 400 may use an ISA bus and appropriate component circuit-board cards to receive the signal, and includes an application infrastructure to change states as required.

According to this embodiment of the present invention, the first processor 400 may also include an ASR proxy that generates raw speech data based on the telephony signal. The speech data is sent to a second processor 450 through a communication link 420. Because the communication link 420 transfers a large amount of unrecognized speech data, it may be a link with a large bandwidth, or a "big pipe," such as an Ethernet connection. The second processor 450 is capable of executing an enhanced speech recognition process, such as the Watson ASR process, to generate recognized speech information based on the received speech data. The results of the speech recognition processing can be provided to the first processor 400 through a control line which may be a link with a very limited bandwidth, or a "little pipe." According to this embodiment of the present invention, the NLP and dialog control process, similar to those described in detail with respect to FIG. 2, may execute in the first processor 400 and communicate with the application infrastructure using an application command emulation interface. As a result, the first processor 400 changes state as appropriate.

Figure 5:
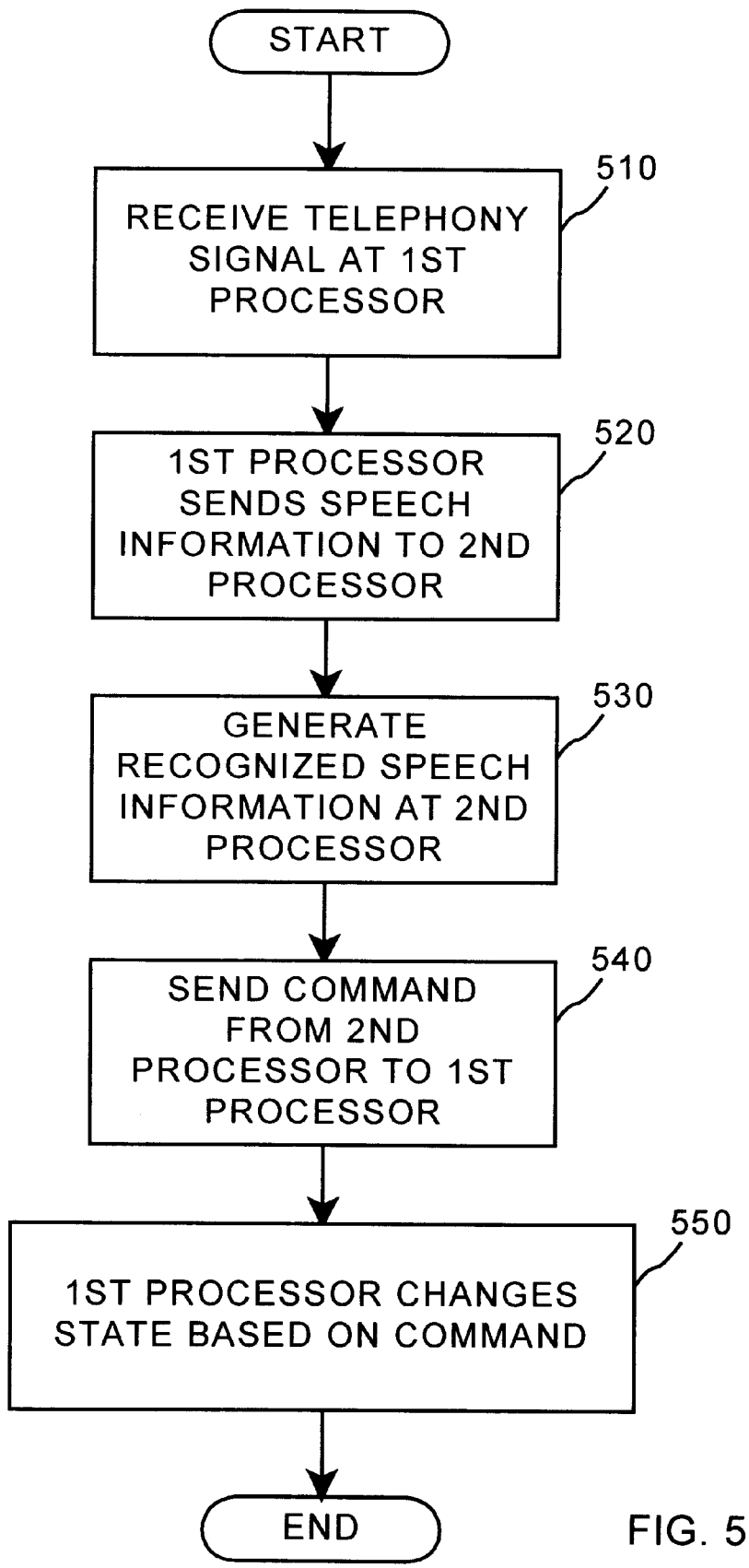
FIG. 5 is a block flow diagram of a method for providing enhanced speech recognition according to the embodiment of the present invention shown in FIG. 4.

FIG. 5 is a block flow diagram of a method for providing enhanced speech recognition according to the embodiment of the present invention shown in FIG. 4. After the process begins, a telephony signal is received by a first processor at step 510, and the first processor sends raw speech data to the second processor at step 520. Recognized speech information is generated by the second processor based on the raw speech data at step 530, and a command is sent from the second processor to the first processor based on the recognized speech information as indicated at step 540. Finally, the first processor changes state based on the command at step 550.

Although various embodiments are specifically illustrated and described herein, it will be appreciated that modifications and variations of the present invention are covered by the above teachings and within the purview of the appended claims without departing from the spirit and intended scope of the invention. For example, although particular architectures have been used to illustrate the present invention, it can be appreciated that other architectures will also fall within the scope of the invention. Moreover, although hardware or software have been used to implement certain functions described in the present invention, it will be understood by those skilled in the art that such functions may be performed using hardware, software or a combination of hardware and software.

What is claimed is:

1. An enhanced speech recognition system, comprising:
   a first input port configured to receive a telephony signal from a communication network;
   a first processor coupled to said first input port;
   a second input port configured to receive the telephony signal at substantially the same time as the telephony signal is received by said first input port;
   a second processor coupled to said second input port, said second processor being configured to generate recognized speech information based on the telephony signal; and
   a control line coupled between said first and second processors.

2. The system of claim 1, wherein said second processor is further configured to send a command to said first processor through said control line based on the recognized speech information, and said first processor is further configured to change states based on the command.

3. The system of claim 2, wherein said first processor changes state by re-routing the telephony signal.

4. The system of claim 2, wherein said first processor includes a lightweight proxy that communicates with an application infrastructure in said first processor, using an application command emulation interface, to change a state of said first processor based on the command.

5. The system of claim 1, wherein said first processor is further configured to enter one of a first plurality of states based on the telephony signal and said second processor is further configured to enter one of a second plurality of states based on the telephony signal such that the state of said second processor corresponds to the state of said first processor at a given point during a telephone call.

6. The system of claim 5, wherein at least one of the first and second plurality of states represents a state associated with the determination of the purpose of a telephone call.

7. The system of claim 1, wherein said second processor uses an advanced speech recognition process and a dialog control process to generate the recognized speech information based on the telephony signal.

8. An enhanced speech recognition system, comprising
   a first input port configured to receive a telephony signal from a communication network;
   a first processor coupled to said first input port, said first processor being configured to enter one of a first plurality of states based on the telephony signal;
   a second input port configured to receive information associated with the telephony signal;
   a second processor coupled to said second input port, said second processor being configured to generate recognized speech information based on the received information associated with the telephony signal; and
   a control line coupled between said first and second processors,
   wherein said second processor is further configured to enter one of a second plurality of states based on the information associated with the telephony signal such that the state of said second processor corresponds to the state of said first processor at a given point during a telephone call.

9. The system of claim 8, wherein at least one of the first and second plurality of states represents a state associated with the determination of the purpose of a telephone call.

10. An enhanced speech recognition system, comprising
    a first input port configured to receive a telephony signal from a communication network;

a first processor coupled to said first input port, said first processor being configured to generate speech data based on the telephony signal;

a second input port configured to receive the speech data generated by said the first processor;

a second processor coupled to said second input port, said second processor being configured to generate recognized speech information based on the speech data; and a control line coupled between said first and second processors.

11. The system of claim 10, wherein said second processor is further configured to send a command to said first processor through said control line based on the recognized speech information, and said first processor is further configured to change states based on the command.

12. The system of claim 10, wherein said second input port is configured to receive the speech data through an Ethernet connection.

13. The system of claim 10, wherein said first processor uses an automatic speech recognition proxy and an application infrastructure to change states based on the command.

14. An enhanced speech recognition system, comprising:

a first input port configured to receive a telephony signal from a communication network;

a first processor coupled to said first input port;

a second input port configured to receive the telephony signal at substantially the same time as the telephony signal is received by said first input port;

a second processor coupled to said second input port, said second processor being configured to generate recognized speech information based on the telephony signal; and a control line coupled between said first and second processors, wherein said second processor is further configured to send a command to said first processor through said control line based on the recognized speech information.

15. The system of claim 14, wherein said first processor is further configured to change states based on the command.

16. The system of claim 15, wherein said first processor changes state by re-routing the telephony signal.

17. The system of claim 14, wherein said first processor is further configured to enter one of a first plurality of states based on the telephony signal and said second processor is further configured to enter one of a second plurality of states based on the telephony signal such that the state of said second processor corresponds to the state of said first processor at a given point during a telephone call.

18. The system of claim 17, wherein at least one of the first and second plurality to states represents a state associated with the determination of the purpose of a telephone call.

19. The system of claim 14, wherein said second processor uses an advanced speech recognition process and a dialog control process to generate the recognized speech information based on the telephony signal.

20. The system of claim 14, wherein said first processor includes a lightweight proxy that communicates with an application infrastructure in said first processor, using an application command emulation interface, to change a state of said first processor based on the command.

21. The system of claim 14, wherein the control line is a communication link that operates using a unidirectional command protocol.

22. An enhanced speech recognition apparatus, comprising:

a processor configured to receive a telephony signal that is delivered to a second processor, wherein the processor is configured to generate recognized speech information based on the telephony signal received and is further configured to send a command to the second processor based on the recognized speech information.

23. The apparatus of claim 22, further comprising:

an input port configured to receive the telephony signal from a communication network.

24. The apparatus of claim 22, further comprising:

a control line coupled to the processor, wherein the command to the second processor is sent via the control line.

25. The apparatus of claim 22, wherein the processor is configured to enter one of a plurality of states based on the telephony signal.

26. An enhanced speech recognition system, comprising a first input port configured to receive a telephony signal from a communication network;

a first processor coupled to said first input port, said first processor being configured to generate speech data based on the telephony signal;

a second input port configured to receive the speech data generated by said the first processor;

a second processor coupled to said second input port, said second processor being configured to generate recognized speech information based on the speech data; and a control line coupled between said first and second processors, wherein said second processor is further configured to send a command to said first processor through said control line based on the recognized speech information.

27. The system of claim 26, wherein said first processor is further configured to change states based on the command.

28. The system of claim 26, wherein said second input port is configured to receive the speech data through an Ethernet connection.

29. The system of claim 26, wherein said first processor uses an automatic speech recognition proxy and an application infrastructure to change states based on a command.

30. A method for performing enhanced speech recognition, comprising receiving a telephony signal at a first processor and a second processor;

generating recognized speech information at the second processor based on the telephony signal;

sending a command from the second processor to the first processor based on the recognized speech information; and re-routing the telephony signal at the first processor based on the command.

31. The method of claim 30, further comprising the steps of:

entering one of a plurality of first processor states based on the telephony signal; and entering one of a plurality of second processor states based on the telephony signal such that the second processor state corresponds to the first processor state at a given point during a telephone call.

32. The method of claim 30, further comprising:

translating the command using a proxy application.

33. A method for performing enhanced speech recognition, comprising receiving a telephony signal at a first processor;

entering one of a plurality of first processor states based on the telephony signal;

receiving information associated with the telephony signal at a second processor;

entering one of a plurality of second processor states based on the information associated with the telephony signal such that the second processor state corresponds to the first processor state at a given point during a telephone call;

generating recognized speech information at the second processor based on the telephony signal;

sending a command from the second processor to the first processor based on the recognized speech information; and entering a new first processor state based on the command.

34. The method of claim 33, further comprising:

translating the command using a proxy application.

35. The method of claim 33, further comprising:

translating the command using a proxy application.

36. A method for performing enhanced speech recognition, comprising receiving a telephony signal at a first processor;

sending speech information from the first processor to a second processor based on the telephony signal;

generating recognized speech information at the second processor based on the speech information;

sending a command from the second processor to the first processor based on the recognized speech information; and changing a state of the first processor based on the command.

37. A machine-readable medium having stored thereon a plurality of executable instructions, the plurality of instructions comprising instructions to:

receive a telephony signal at a first processor and a second processor;

generate recognized speech information at the second processor based on the telephony signal;

send a command from the second processor to the first processor based on the recognized speech information; and re-route the telephony signal at the first processor based on the command.

38. The machine readable medium of claim 37, further comprising instructions to:

enter one of a plurality of first processor states based on the telephony signal.

39. The machine readable medium of claim 37, further comprising instructions to:

enter one of a plurality of second processor states based on the telephony signal such that the second processor state corresponds to the first processor state at a given point during a telephone call.

40. The machine readable medium of claim 39, further comprising instructions to:

translate the command using a proxy application.

* * * * *